United States Patent [19]

Nielsen

[11] Patent Number: 5,243,398
[45] Date of Patent: Sep. 7, 1993

[54] SURVEYING INSTRUMENT INCLUDING LOW POWER LIGHT PLANE GENERATOR

[75] Inventor: Edward G. Nielsen, Grand Rapids, Mich.

[73] Assignee: Laser Alignment, Inc., Grand Rapids, Mich.

[21] Appl. No.: 657,097

[22] Filed: Feb. 15, 1991

[51] Int. Cl.⁵ .............................................. G01B 11/26
[52] U.S. Cl. ................................................... 356/138
[58] Field of Search ............................. 356/138–143, 356/152, 248; 33/227, 290, DIG. 21

[56] References Cited

U.S. PATENT DOCUMENTS

| | | | |
|---|---|---|---|
| 1,922,791 | 8/1933 | Bumpus . | |
| 3,469,919 | 9/1969 | Zellner . | |
| 3,471,234 | 10/1969 | Studebaker . | |
| 3,588,255 | 3/1968 | Alexander | 356/153 |
| 3,591,926 | 2/1968 | Trice, Jr. | 33/46 |
| 3,603,691 | 9/1971 | Hamilton | 356/152 |
| 3,706,284 | 12/1972 | Plasser et al. | 104/7 B |
| 3,736,058 | 5/1973 | Iadarola | 356/4 |
| 3,771,876 | 11/1973 | Ljungdahl et al. | 356/138 |
| 3,775,929 | 12/1973 | Roodvoets et al. | 52/747 |
| 3,819,273 | 6/1975 | Unema | 356/152 |
| 3,822,943 | 7/1974 | Manson | 356/138 |
| 3,823,313 | 7/1974 | Unema | 240/44.26 |
| 3,854,820 | 12/1974 | Hansen | 356/138 |
| 3,856,409 | 12/1974 | Cindrich et al. | 356/138 |
| 3,902,810 | 9/1975 | Hamar | 356/138 |
| 3,907,435 | 9/1975 | Roodvoets | 356/153 |
| 3,907,436 | 9/1975 | Wolga | 356/153 |
| 3,936,197 | 2/1976 | Aldrink | 356/250 |
| 3,966,328 | 6/1976 | Wiklund | 356/138 |
| 4,007,992 | 2/1977 | Petrophilos et al. | 356/160 |
| 4,293,218 | 10/1981 | Nielsen et al. | 356/138 |
| 4,836,669 | 6/1989 | Teach | 356/138 X |
| 4,836,671 | 6/1989 | Bautista | 356/152 |

FOREIGN PATENT DOCUMENTS 729935 8/1932 France .
0256193 2/1990 Japan .

OTHER PUBLICATIONS

Kern Instruments, Inc. publication entitled "GKO-A Automatic Level".

Primary Examiner—Richard A. Rosenberger
Assistant Examiner—K. P. Hantis
Attorney, Agent, or Firm—Price, Heneveld, Cooper, DeWitt & Litton

[57] ABSTRACT

A surveying instrument is provided which includes an optical sighting scope having a sighting barrel and orthogonal reticular lines visible to an observer viewing through the barrel, in combination with a miniature light plane generator that is oriented to produce a plane of light that is coincident with one of the reticular lines in the direction viewed by an observer viewing through the barrel of the optical sighting scope. The miniature light plane generator includes a laser diode that generates a beam of light, a collimating lens positioned within the beam of light generated by the laser diode in order to produce a beam of collimated light, and a fan lens positioned within the beam of collimated light in order to divert the beam of light into a plane. The miniature generator additionally includes a power supply that supplyies power at a low duty cycle. Because of the resulting reduction in electrical power required by the generator, the components making up the generator, including a battery for supplying energy to the power supply, may be combined within the housing of the optical sighting scope in order to provide a compact instrument.

19 Claims, 8 Drawing Sheets

SURVEYING INSTRUMENT INCLUDING LOW POWER LIGHT PLANE GENERATOR

BACKGROUND OF THE INVENTION

This invention relates generally to a surveying instrument, or apparatus, and more particularly to a surveying instrument providing both an optical sighting scope and planar referencing device that generates a datum plane of light for surveying tasks.

Figure 1:
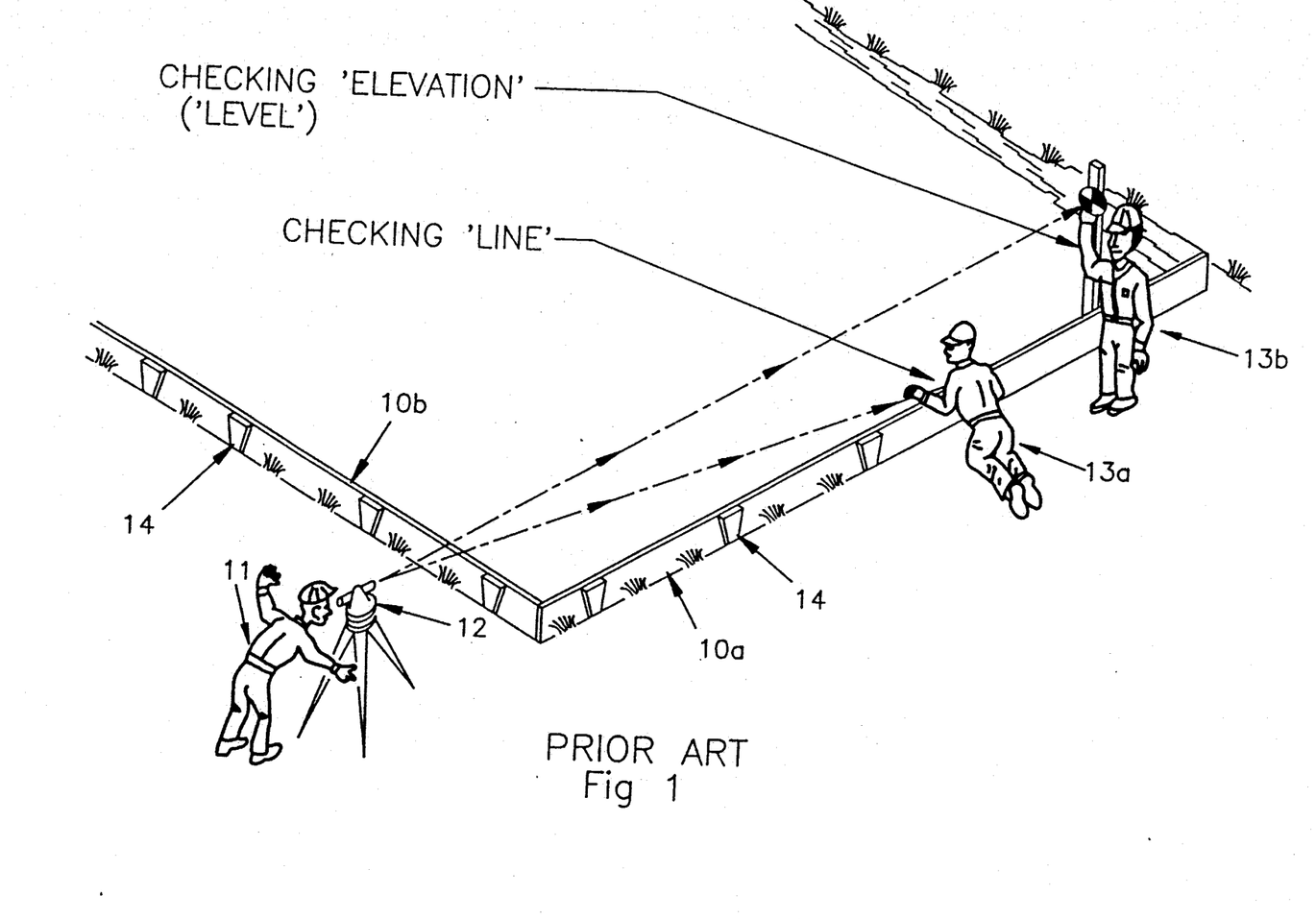
FIG. 1 is an illustration of performing a surveying task using a conventional surveying instrument.

In order to perform a surveying task, such as locating footer forms 10a, 10b using a conventional transit 12, a first operator 11 must observe the image of stakes 14, or the like, being moved about by a remote worker 13a, while the first operator uses arm and hand or voice signals to communicate movement to the remote worker (FIG. 1). Once the line is established in this manner, height or elevation may be established by using a measuring stick 16, which is raised or lowered by the remote worker 13b in response to communications from the first operator, until the desired elevation is reached.

While such conventional technique is suitable when two or more workers are available and under fairly controlled site conditions, the effort required increases enormously if the same individual must make the observation and adjust the implement observed, especially when the site is overgrown or otherwise presents difficult terrain. In order to allow an individual operator to perform a surveying task, devices have been developed that generate a datum plane of light, which may be set up at a particular vertical or horizontal plane and used by the same operator, holding a remote light sensor, to establish required headings and elevations.

Prior art datum plane light generators have not met their full potential because they have been too expensive and require bulky power supplies in order to power the gas laser and rotating motor typically used in such devices to generate a light plane. Accordingly, such devices have been relegated to fairly specialized applications and have not found general use.

SUMMARY OF THE INVENTION

The present invention provides a datum light plane generator that is extremely efficient in power usage and may, therefore, be made compact. According to the invention, such miniature light plane generator includes a laser diode that generates a beam of light, a collimating lens positioned within the beam of light generated by the laser diode in order to produce a beam of collimated light, and a fan lens positioned within the beam of collimated light in order to divert the light beam into a plane. In order to provide light output at useful levels without excessive power usage, power supply means are provided for supplying power to the laser diode at a low duty cycle. In the illustrated embodiment, the duty cycle is established in the range of two to six percent. This allows the miniature generator to be powered by a miniature battery, which may be positioned in the housing along with the rest of the components.

According to another aspect of the invention, a surveying instrument is provided that includes a miniature generator for projecting a datum plane of light combined with an optical sighting scope that includes a sighting barrel and means defining orthogonal reticular lines that are visible to an observer viewing through the barrel. According to this aspect of the invention, a first light generator is adapted to projecting a datum plane of light to coincide with one of the reticular lines in the direction viewed by an observer viewing through the barrel and a second light generator is provided that is adapted to projecting a datum plane of light to coincide with the other one of the reticular lines in the direction viewed by an observer viewing through the barrel. This conveniently provides vertical and horizontal datum planes which may be used concurrently, or alternatively, with the optical aspects of such a surveying apparatus.

According to yet another aspect of the invention, a surveying apparatus includes a housing and means defining an optical passage through the housing. Means defining orthogonal reticular lines, observable by an observer viewing along a line of sight through the passage, is provided in the housing and a miniature light generator is positioned in the housing for generating a datum plane of collimated light transverse the optical passage. Optical means are provided in the passage for diverting the plane of light in the direction of the line of sight of the observer and coincident with one of the reticular lines along the line of sight. This provides an exceptionally compact instrument that includes all of the features of a conventional transit while incorporating the capabilities of generating a datum plane of light in a unitary instrument that does not require a separate external power supply.

These and other objects, advantages and features of this invention will become apparent upon review of the following specification in conjunction with the drawings.

DESCRIPTION OF THE PREFERRED EMBODIMENT

Figure 3:
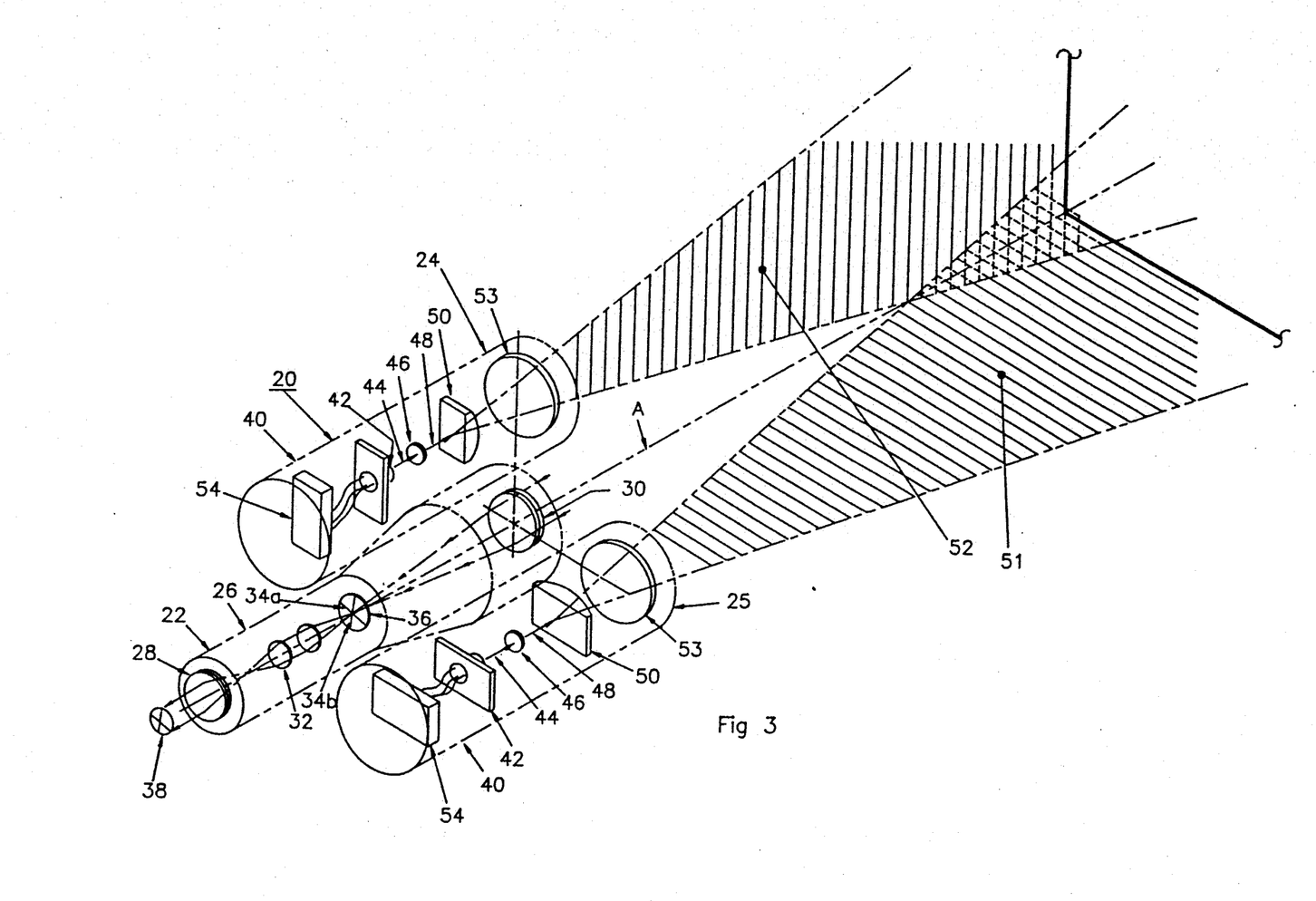
FIG. 3 is a perspective view of a surveying apparatus according to the invention with the housing removed in order to reveal internal structure.

Referring now specifically to the drawings, and the illustrative embodiments depicted therein, a surveying instrument, or apparatus, 20 includes a standard optical sighting scope, or transit, 22 and first and second miniature generators 24, 25 each for generating a datum plane of light. As is conventional, transit 22 includes a barrel-shaped housing 26, an eye-piece 28 at one end of housing 26 and a lens 30 at an opposite end of housing 26. Additionally positioned within housing 26 is an optic assembly, generally shown at 32, including a pair of orthogonal reticular lines 34a, 34b provided on a lens 36. An image 38 observed by an observer viewing into eye-piece 28 includes the light pattern intercepted by lens 30 along axis A, as magnified by optic assembly 32, with orthogonal reticular lines superimposed thereon. Transit 22 is typically set up in a manner that one reticular line is horizontally oriented and the other is vertically oriented.

Each miniature light generator 24, 25 includes a housing 40 and means within the housing for generating a plane of light. This generating means includes a laser diode 42 which emits a light beam 44 and a collimating lens 46 positioned to intercept beam 44 in order to provide a beam 48 of collimated light. Collimated light beam 48 is passed through a cylindrical, or fan, lens 50 in order to produce an arcuate, or pie-shaped, planar beam of light 51, 52. An optional output window 53 closes the open end of housing 40 while passing the respective beam of light 51, 52 therethrough. An electrical power supply 54 supplies electrical energy to laser diode 42 in order to cause the diode to emit light. Power supply 54 is powered by a miniature battery 56 and is of such a reduced size that the combination of power supply and battery is capable of being positioned within housing 40. In this manner, an extremely compact, self-enclosed, surveying instrument is provided. Miniature generators 24 and 25 are positioned on, and oriented with respect to, transit 22 such that the plane of light 52 generated by miniature generator 24 is coincident with the image of reticular line 34a and the plane of light generated by miniature generator 25 is coincident with the image of reticular line 34b.

Figure 4:
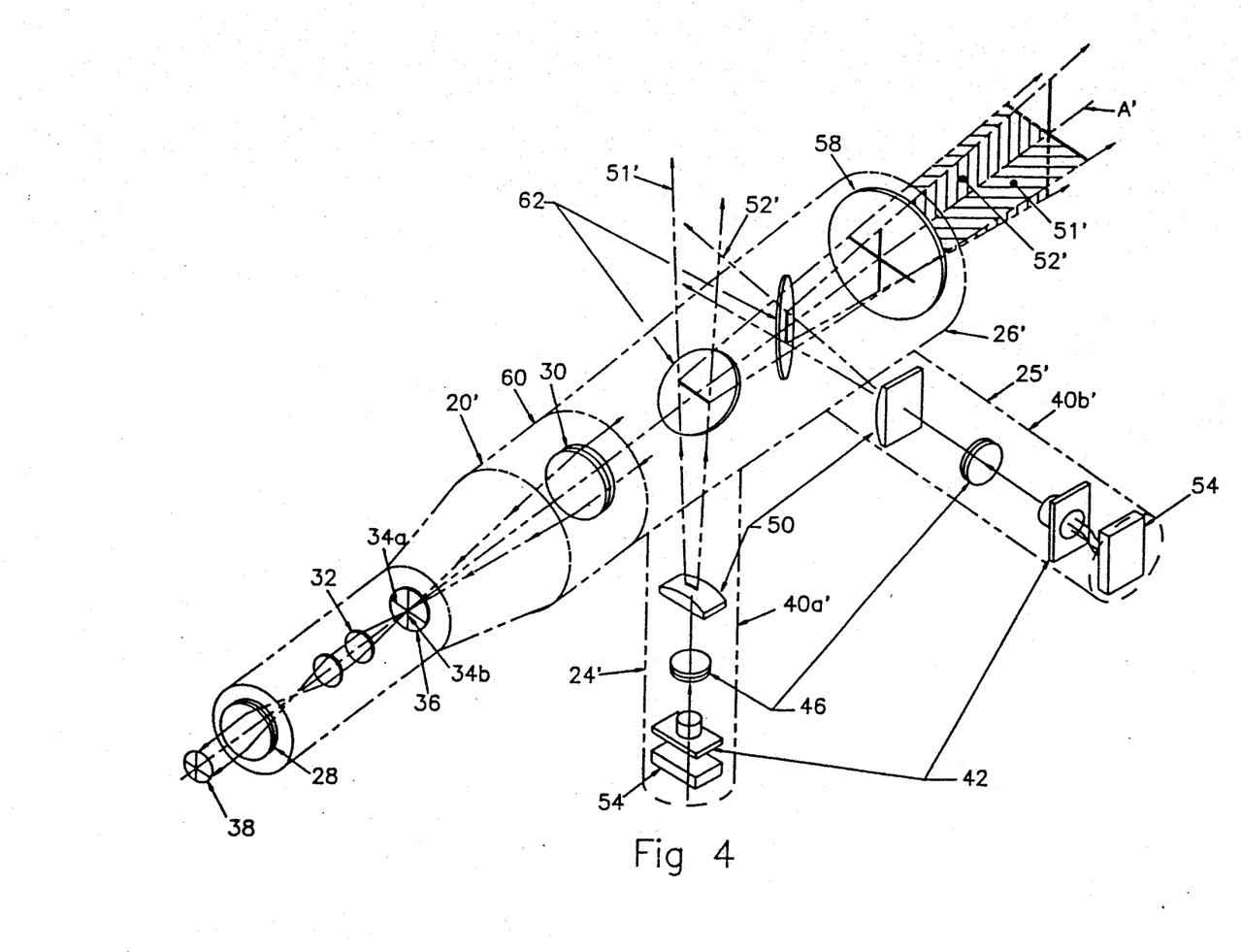
FIG. 4 is the same view as FIG. 3 of an alternative embodiment of the invention.

An alternative surveying instrument 20' is provided, in which the transit and miniature generators are enclosed within a single housing, generally shown at 26' (FIG. 4). Surveying instrument 20' includes eye-piece 28, optics assembly 32 and orthogonal reticular lines 34a, 34b defined on lens 36 in order to provide an image 38, upon which is superimposed reticular lines 34a, 34b. An external window 58 is positioned outward of lens 30 in order to seal the image-receiving opening in housing 26'.

A pair of housing portions 40a' and 40b' enclose miniature light plane generators 24' and 25' respectively, and form extensions of housing 26' that open into the interior thereof. Miniature generators 24' and 25' are oriented such that their respective beams of light 52' are transverse axis A', which is the axis of the image passing through barrel portion 60 of housing 26'. Optical means, such as a pair of beam splitters 62, are positioned within barrel portion 60 in order to divert light planes 51', 52' along the axis A' in a manner that the planar beams of light coincide with reticular lines 34a, 34b as the reticular lines are viewed as image 38. Beam splitters 62 are, accordingly, oriented at 45° with respect to axis A' and divert the respective planar beam of light outwardly through window 58 away from eye-piece 28.

Figure 2:
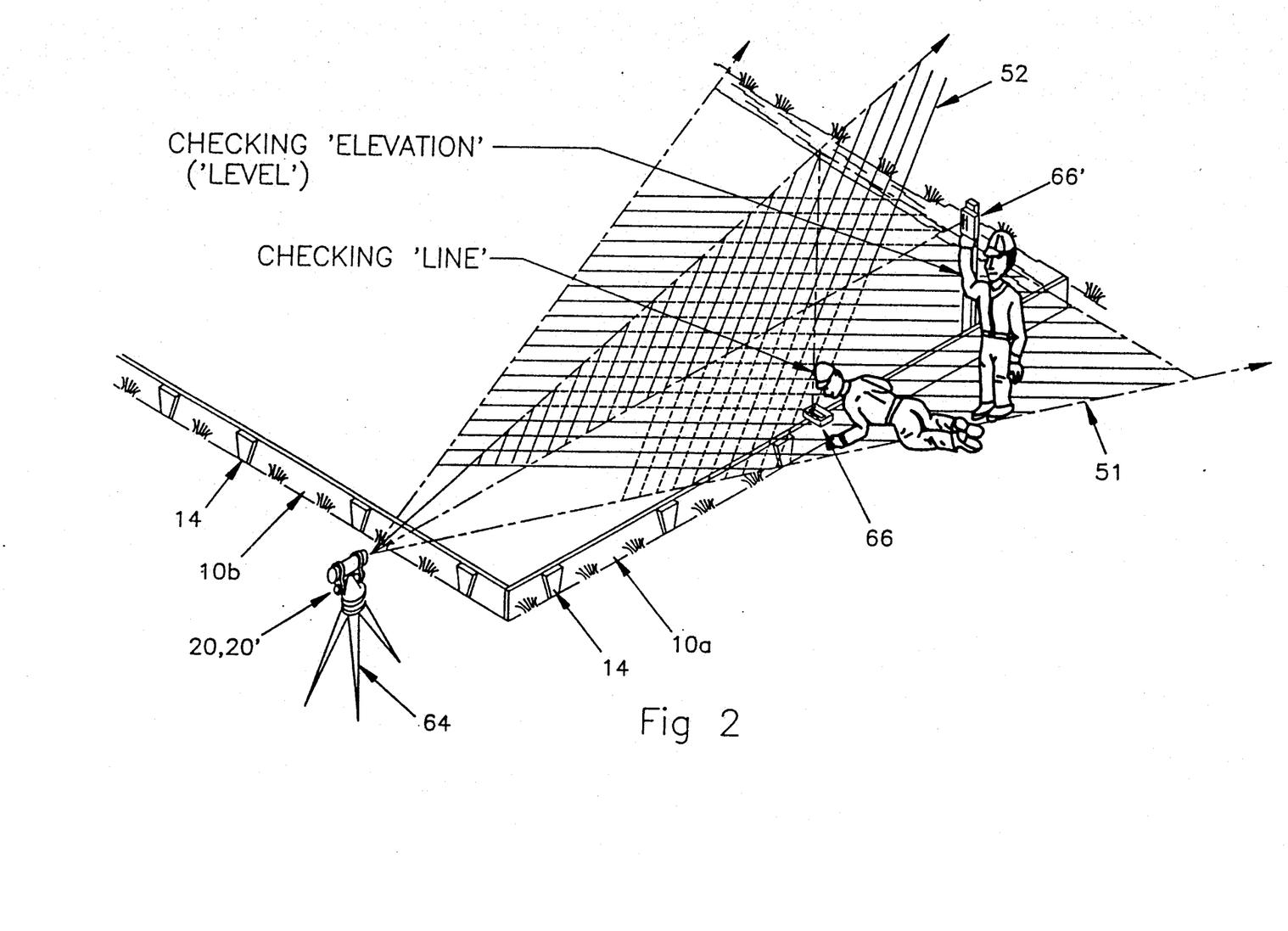
FIG. 2 is an illustration of performing the same task as in FIG. 1 using a surveying apparatus according to the invention.

Surveying instruments 20, 20' may be set-up in the field utilizing a conventional tripod 64 and may incorporate a self-leveling device such as that disclosed in commonly assigned U.S. Pat. No. 3,936,197 for a SELF-LEVELING LASER ASSEMBLY issued to Larry D. Aldrink, Edward G. Nielsen and Willard G. Vogelaar, the disclosure of which is hereby incorporated herein by reference. With instrument 20, 20' leveled, the vertical planar beam of light 52 may be detected using a hand-held sensor 66 in order to position stakes 14 of footer forms 10a, 10b. In order to establish the height of forms 10a, 10b, a rod mounted sensor 66' may be utilized to detect the location of horizontal planar beam of light 51 with the desired elevations being picked from the gradations (not shown) on the associated rod.

Figure 5A:
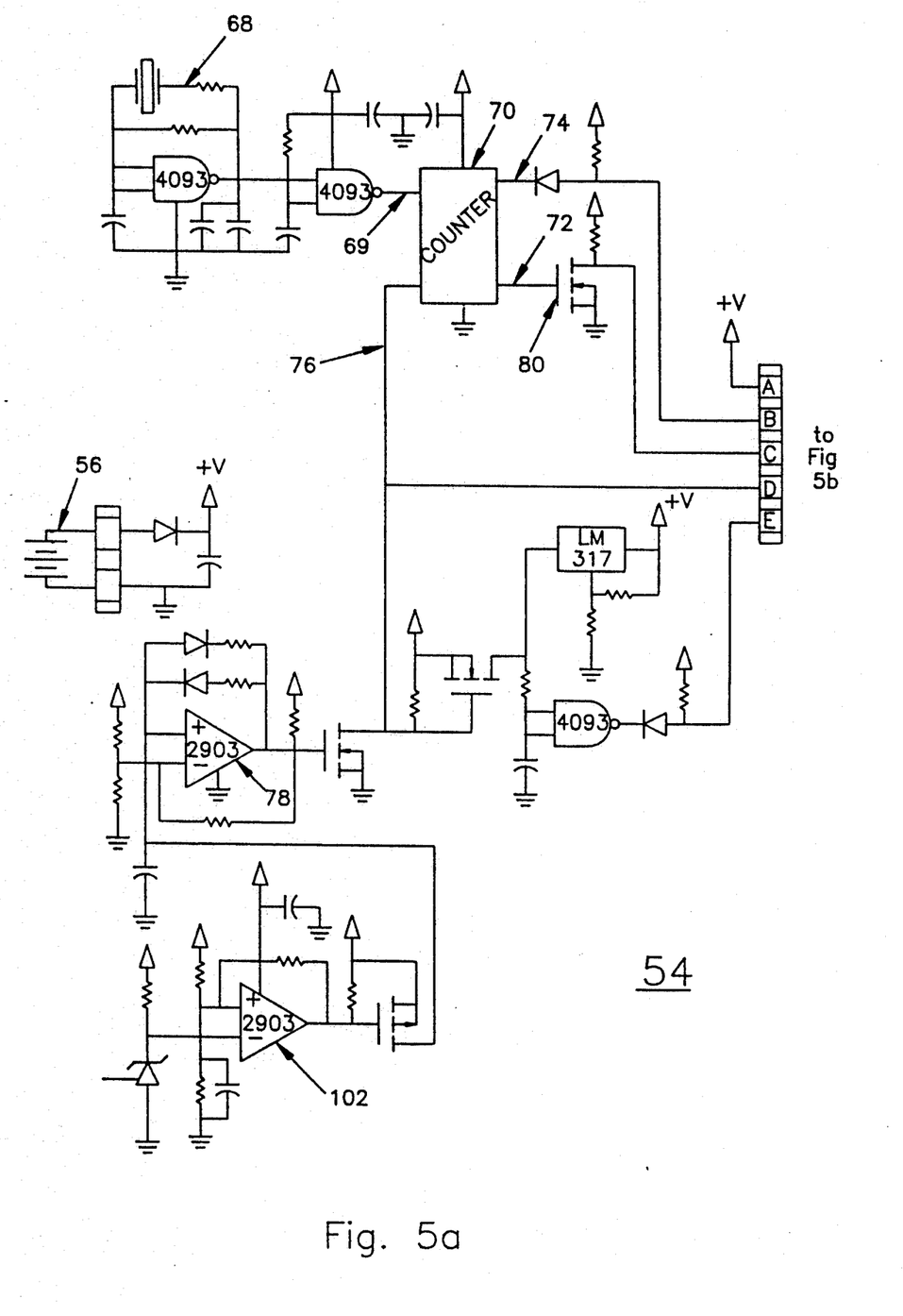
FIGS. 5A and 5B illustrate an electrical schematic diagram of a miniature light generator power supply according to the invention.
Figure 5B:
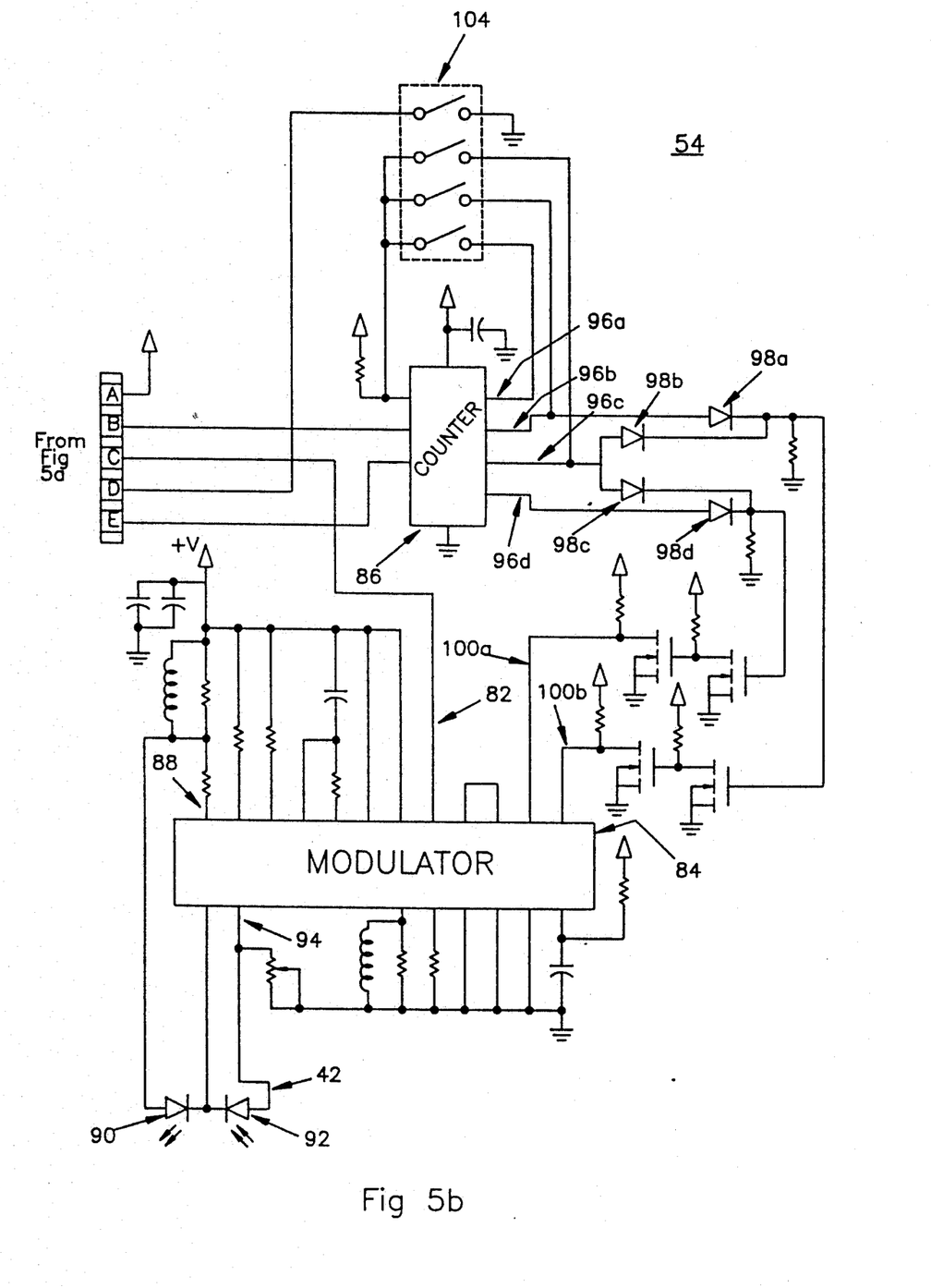

Power supply 54 for operating laser diode 42 includes a 400 KHz oscillator 68 which is provided as an input to a binary counter 70 which includes a divide-by-eight output 72 and a divide-by-one thousand fifty two output 74 (FIGS. 5A and 5B). Counter 70 receives an enabling input on line 76 which is generated by an interval timer 78. Output 72, in turn, gates a transistor 80 in order to provide an input 82 to a modulation circuit 84. Modulation circuit 84 produces an output 88 that is used to gate a light emitting diode 90 in laser diode 42. Laser diode 42 additionally includes a monitor diode 92 to provide an input 94 representative of the strength of the output of light emitting diode 90. Monitor diode 92 is utilized by modulation circuit 84 in order to produce a constant light output from light emitting diode 90. Output 74 is provided as an input to a decade counter 86. Decade counter 86 includes outputs 96a, 96b, 96c and 96d which are encoded by diodes 98a, 98b, 98c and 98d to provide start-up inputs 100a and 100b to modulation circuit 84. Decade counter 86 produces a sequence of pulses on outputs 96a–96d during start-up conditions in order to provide an orderly operation of modulation circuit 84.

Interval timer 78 produces an output on line 76 that enables counter 70 for between two and three milliseconds and disables counter 70 for between 47 and 98 milliseconds. Accordingly, counter 70 is enabled at an approximately two to six percent duty cycle. Whenever counter 70 is enabled, pulses are being produced on output 72 at a 50 KHz (20 microsecond repetition) rate. This provides for the modulation of laser diode 42 at 50 KHz for between two and six percent duty cycle.

Power supply 54 additionally includes a low battery monitoring circuit 102 and a test switch 104 which is manually operable during the testing of power supply 54 but is not utilized during actual use. In the illustrated embodiment, modulation circuit 84 and laser diode 42 are a matched set manufactured by Sharp Electronics under Model Numbers IR3C08 and LT021MFO, respectively. Battery 56 is a conventional miniature 9-volt battery of the type used in portable radios, smoke detectors, and the like. A separate power supply 54 is included with each miniature generator 24, 25 but both could be combined into a common power supply for both laser diodes 42 if desired. In the illustrated embodiments, miniature generators 24, 25 produce planar beams 51, 52 having an approximately 10° fan of light. It is estimated that, at a two to six percent duty cycle, a conventional 9-volt battery may last several tens or hundreds of hours.

Figure 6A:
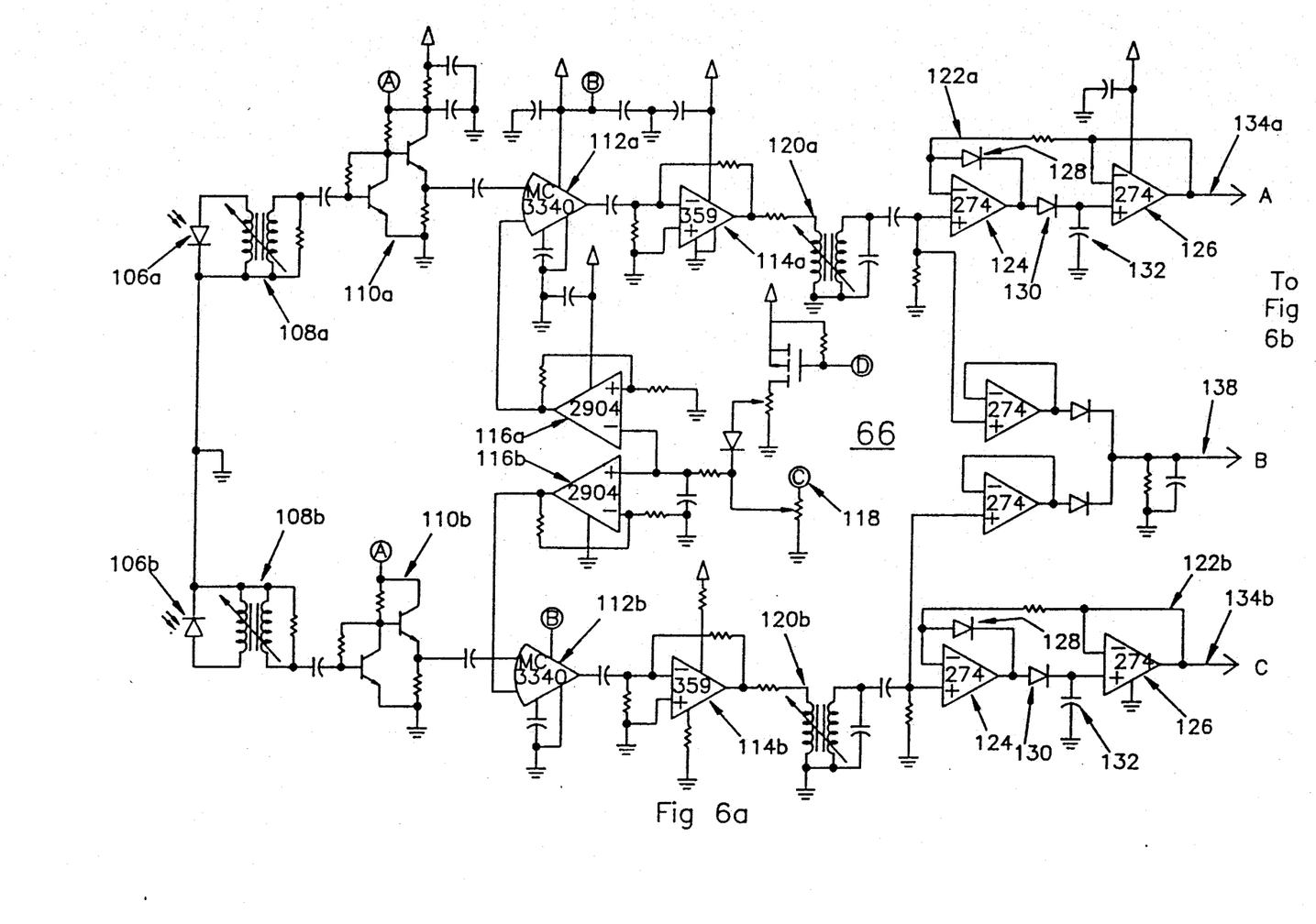
FIGS. 6A and 6B illustrate a electrical schematic diagram of a light receiver useful with the present invention.
Figure 6B:
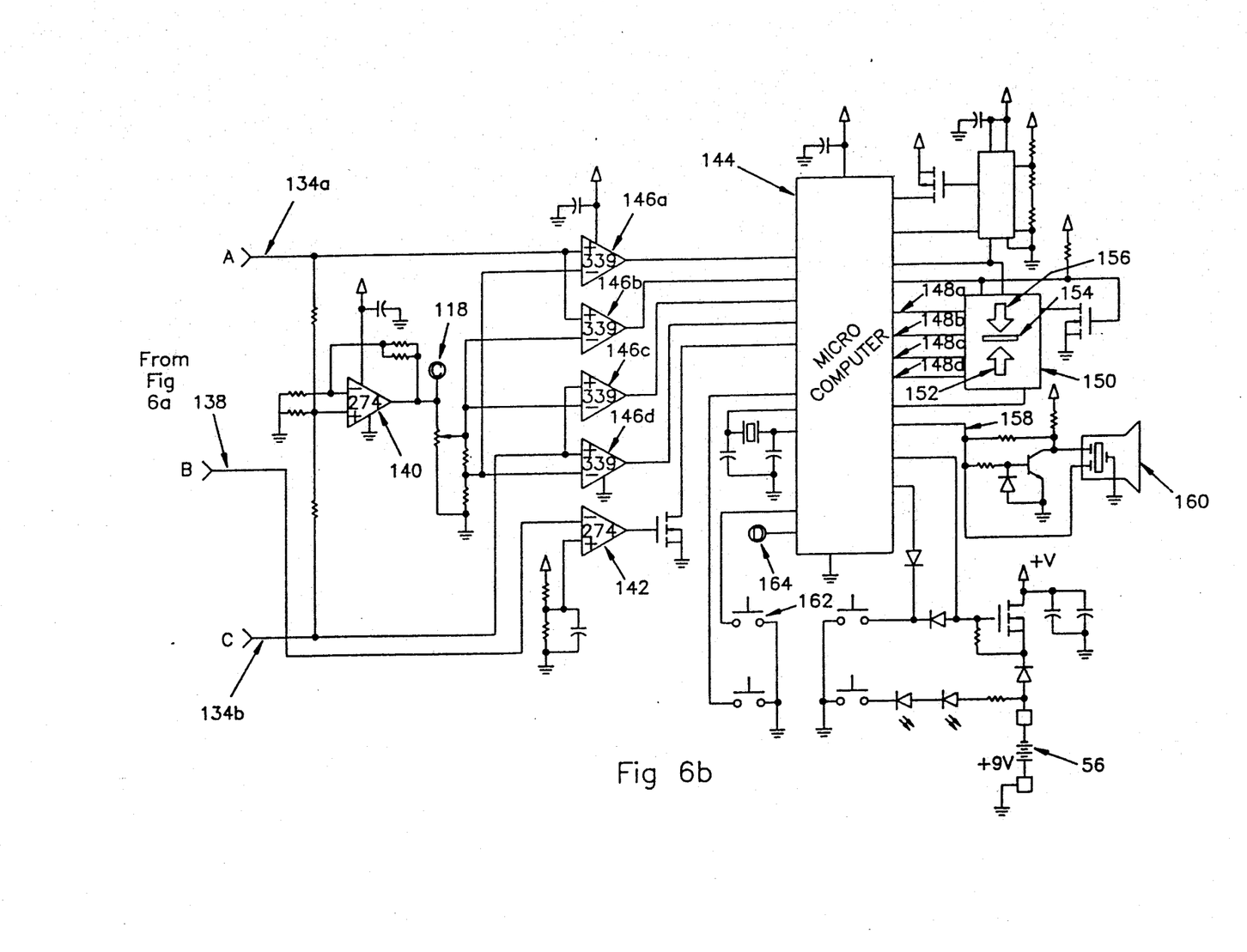

Sensor 66 includes spaced apart light sensitive diodes 106a, 106b each of which is connected through a tunable transformer 108a, 108b to an amplifier 110a, 110b (FIG. 6A). Transformers 108a, 108b are tuned to 50 KHz and amplifiers 110a, 110b have a gain of approximately 40. The outputs of amplifiers 110a, 110b are supplied, respectively, to auto-gain-control amplifiers 112a, 112b and, hence, to amplifier 114a, 114b. The gain of amplifiers 112a, 112b is established by amplifiers 116a, 116b from a control junction 118. The gain of amplifiers 114a, 114b is set to approximately 400. The outputs of amplifiers 114a, 114b are provided, respectively, to tunable transformers 120a, 120b, which are tuned to 50 KHz and, hence, to peak detectors 122a, 122b. Each peak detector includes amplifiers 124 and 126, diodes 128 and 130, and a capacitor 132, configured in order to retain a signal level at the respective one of outputs 134a, 134b that is the peak of the signal presented to peak detector 122a, 122b, for approximately 300 milliseconds. The outputs from transformers 120a and 120b are also combined using amplifiers 136a, 136b whose outputs are joined at 138. Outputs 134a, 134b are combined in an amplifier 140 which establishes the signal level on junction 118 utilized by auto-gain-control amplifiers 112a, 112b (FIG. 6B).

Output 138 is provided to an amplifier 142 which serves as a "wake-up" circuit to activate a microprocessor 144 whenever a light signal above a predetermined level is detected by either diode 116a, 116b. The signal levels on outputs 134a, 134b are supplied to four comparators 146a, 146b, 146c and 146d whose other inputs are supplied with reference voltages derived as scalar values of the signal level at junction 118. The outputs from comparators 146a-146d are supplied as inputs to a microprocessor 144. Microprocessor 144 includes outputs 148a, 148b, 148c and 148d which are supplied as inputs to operate a graphic display 150. Graphic display 150 includes an "up" indicator 152, a "plane coincidence" indicator 154 and a "down" indicator 156 to indicate the relationship of the sensor to the respective light plane 51, 52. Microprocessor 144 additionally includes an output 158 to operate a piezo-electric oscillator, or horn, 160. Horn 160 may be operated at different repetition rates, or pitches, in order to provide an audio indication of the status of indicators 152, 154 and 156. A near/far input switch 162 provides an input to microprocessor 144 whether the receiver 66 is being operated at a close distance (20 feet or less) or a far distance from the surveying instrument 20, 20'. In response to input 162, microprocessor 144 produces an output 164 which is used to control the gain of amplifiers 116a, 116b.

The combination of the low duty cycle of the miniature light-plane generators and the signal retention period of the light sensor provides for extremely accurate beam detection in a compact surveying instrument system. Changes and modifications in the specifically described embodiments can be carried out without departing from the principles of the invention which is intended to be limited only by the scope of the appended claims, as interpreted according to the principles of patent law including the Doctrine of Equivalents.

The embodiments of the invention in which an exclusive property or privilege is claimed are defined as follows:

1. A surveying apparatus for use by an observer, comprising:
   an optical sighting scope including a barrel and means defining orthogonal reticular lines visible to an observer viewing through said barrel;
   a first light generator including a light emitter and optical system adapted to generating and projecting a datum plane of light to coincide with one of said reticular lines in the direction viewed by an observer viewing through said barrel; and
   a second light generator including a second light emitter and optical system adapted to generating and projecting a datum plane of light to coincide with the other one of said reticular lines in the direction viewed by an observer viewing through said barrel.

2. The surveying apparatus in claim 1 further including optic means positioned in said barrel to project the plane of light generated by one of said first and second laser generators along said barrel away from the observer.

3. The surveying apparatus in claim 2 wherein said optic means includes a beam splitter.

4. The surveying apparatus in claim 1 further including optic means positioned in said barrel to project the plane of light generated by each of said first and second laser generators along said barrel away from the observer.

5. The surveying apparatus in claim 4 wherein said optic means includes a pair of beam splitters.

6. The surveying apparatus in claim 1 wherein each of said first and second light generators is positioned to project their respective plane of light substantially perpendicular the axis of said barrel.

7. The surveying apparatus in claim 1 wherein each of said first and second light generators include:
   a laser diode that generates a beam of light; and
   a fan lens positioned within said beam of light; and
   power supply means for supplying power to said laser diode.

8. The surveying apparatus in claim 7 wherein said power supply means supplies power to said laser diode at a low duty cycle.

9. A surveying apparatus for use by an observer, comprising:
   a housing and means defining an optical passage through said housing;
   means defining orthogonal reticular lines observable by an observer viewing along a line of sight through said optical passage;
   a miniature light generator positioned in said housing for generating a datum plane of light transverse said optical passage; and
   optical means in said passage for diverting said plane of light in the direction of said line of sight of said observer and coincident with one of said reticular lines along said line of sight.

10. The surveying apparatus in claim 9 wherein said miniature light generator includes:
    a laser diode that generates a beam of light;
    a collimating lens positioned within the beam of light generated by said laser diode in order to produce a beam of collimated light;
    a fan lens positioned within said beam of collimated light; and
    power supply means for supplying power to said laser diode.

11. The surveying apparatus in claim 10 wherein said power supply means supplies power to said laser diode at a low duty cycle.

12. The surveying apparatus in claim 10 wherein said power supply includes a battery positioned in said housing.

13. The surveying apparatus in claim 9 wherein said optical means includes a beam splitter positioned in said passage.

14. The surveying apparatus in claim 9 further including another miniature light generator positioned in said housing for generating another datum plane of light transverse said optical passage and wherein said optical means diverts said another plane of light in said direction of said line of sight of said observer and coincident with the other one of said reticular lines along said line of sight.

15. The surveying apparatus in claim 14 wherein said light generators are angularly offset from each other 90 degrees with respect to said line of sight of said observer.

16. The surveying apparatus in claim 14 wherein said optical means includes a pair of beam splitters, each of said beam splitters positioned to divert one of said planes of light in said direction of said line of sight of said observer.

17. The surveying apparatus in claim 14 wherein each of said miniature light generators includes:
- a laser diode that generates a beam of light;
- a collimating lens positioned within the beam of light generated by said laser diode in order to produce a beam of collimated light;
- a fan lens positioned within said beam of collimated light; and
- power supply means for supplying power to said laser diode.

18. The surveying apparatus in claim 17 further including a battery in said housing for supplying electrical energy to said power supply means.

19. The surveying apparatus in claim 17 wherein said power supply means supplies power to said laser diode at a low duty cycle.

* * * * *